(12) United States Patent
Hsieh et al.

(10) Patent No.: US 12,477,631 B2
(45) Date of Patent: Nov. 18, 2025

(54) DIMMING METHOD AND CURRENT DRIVING DEVICE

(71) Applicant: Macroblock, Inc., Hsinchu (TW)

(72) Inventors: Chi-Min Hsieh, Hsinchu (TW); Chun-Yi Li, Hsinchu (TW)

(73) Assignee: Macroblock, Inc., Hsinchu (TW)

(*) Notice: Subject to any disclaimer, the term of this patent is extended or adjusted under 35 U.S.C. 154(b) by 29 days.

(21) Appl. No.: 18/772,377

(22) Filed: Jul. 15, 2024

(65) Prior Publication Data

US 2025/0048514 A1 Feb. 6, 2025

(30) Foreign Application Priority Data

Jul. 31, 2023 (TW) ................................. 112128676

(51) Int. Cl.
*H05B 45/12* (2020.01)
*H05B 45/325* (2020.01)
*H05B 45/3725* (2020.01)

(52) U.S. Cl.
CPC ........... *H05B 45/12* (2020.01); *H05B 45/325* (2020.01); *H05B 45/3725* (2020.01)

(58) Field of Classification Search
CPC .............. H05B 45/325; H05B 45/3725; H05B 45/10–12; H05B 45/20–22; G09G 3/32; G09G 2320/0626
See application file for complete search history.

(56) References Cited

U.S. PATENT DOCUMENTS

| 10,314,131 | B1* | 6/2019 | Chen | ....................... | H05B 45/44 |
| 10,542,593 | B1* | 1/2020 | Mignoli | ................. | H05B 45/54 |
| 2020/0169708 | A1* | 5/2020 | Su | ......................... | H04N 9/3164 |

\* cited by examiner

*Primary Examiner* — Renan Luque
(74) *Attorney, Agent, or Firm* — Akerman LLP; Peter A. Chiabotti

(57) ABSTRACT

A dimming method is to be implemented by a brightness divider, and includes steps of: (A) determining whether a brightness value is smaller than or equal to a predetermined reference value; (B) when it is determined in step (A) that the brightness value is smaller than or equal to the predetermined reference value, setting a magnitude value that is related to a current generator, and setting a pulse width value that is related to a switch based on the brightness value; and (C) when it is determined in step (A) that the brightness value is not smaller than or equal to the predetermined reference value, setting the magnitude value based on the brightness value, the predetermined reference value and a predetermined order setting, and setting the pulse width value based on the predetermined reference value.

15 Claims, 15 Drawing Sheets

| t | T1 (3) | T2 (2) | T3 (1) | T4 (0) | T5 (4) | T6 (5) | T7 (6) | T8 (7) |
|---|---|---|---|---|---|---|---|---|
| current output | 28 | 27 | 26 | 25 | 29 | 30 | 31 | |
| | 20 | 19 | 18 | 17 | 21 | 22 | 23 | 24 |
| | 12 | 11 | 10 | 9 | 13 | 14 | 15 | 16 |
| | 4 | 3 | 2 | 1 | 5 | 6 | 7 | 8 |

| t | T1 (7) | T2 (6) | T3 (5) | T4 (0) | T5 (1) | T6 (2) | T7 (3) | T8 (4) |
|---|---|---|---|---|---|---|---|---|
| current output | | 31 | 30 | 25 | 26 | 27 | 28 | 29 |
| | 24 | 23 | 22 | 17 | 18 | 19 | 20 | 21 |
| | 16 | 15 | 14 | 9 | 10 | 11 | 12 | 13 |
| | 8 | 7 | 6 | 1 | 2 | 3 | 4 | 5 |

SC

|       | T1  | T2  | T3  | T4  | T5  | T6  | T7  | T8  |
|-------|-----|-----|-----|-----|-----|-----|-----|-----|
| t1    | (7) | (6) | (5) | (0) | (1) | (2) | (3) | (4) |
| t2    | (0) | (1) | (2) | (3) | (4) | (5) | (6) | (7) |
| current output | 25 | 26 | 27 | 28 | 29 | 30 | 31 |    |
|       | 17  | 18  | 19  | 20  | 21  | 22  | 23  | 24  |
|       | 9   | 10  | 11  | 12  | 13  | 14  | 15  | 16  |
|       | 8   | 7   | 6   | 1   | 2   | 3   | 4   | 5   |

FIG. 11

|       | T1  | T2  | T3  | T4  | T5  | T6  | T7  | T8  |
|-------|-----|-----|-----|-----|-----|-----|-----|-----|
| t1    | (3) | (2) | (1) | (0) | (4) | (5) | (6) | (7) |
| t2    | (7) | (6) | (5) | (4) | (3) | (2) | (1) | (0) |
| current output | 31 | 30 | 29 | 28 | 27 | 26 | 25 |    |
|       | 24  | 23  | 22  | 21  | 20  | 19  | 18  | 17  |
|       | 16  | 15  | 14  | 13  | 12  | 11  | 10  | 9   |
|       | 4   | 3   | 2   | 1   | 5   | 6   | 7   | 8   |

FIG. 12

|      | T1  | T2  | T3  | T4  | T5  | T6  | T7  | T8  |
|------|-----|-----|-----|-----|-----|-----|-----|-----|
| t1   | (3) | (2) | (1) | (0) | (4) | (5) | (6) | (7) |
| t2   | (0) | (1) | (2) | (3) | (4) | (5) | (6) | (7) |
| current output | 25 | 26 | 27 | 28 | 29 | 30 | 31 |    |
|      | 17 | 18 | 19 | 20 | 21 | 22 | 23 | 24 |
|      | 9  | 10 | 11 | 12 | 13 | 14 | 15 | 16 |
|      | 4  | 3  | 2  | 1  | 5  | 6  | 7  | 8  |

FIG. 13

|      | T1  | T2  | T3  | T4  | T5  | T6  | T7  | T8  |
|------|-----|-----|-----|-----|-----|-----|-----|-----|
| t1   | (7) | (6) | (5) | (0) | (1) | (2) | (3) | (4) |
| t2   | (7) | (6) | (5) | (4) | (3) | (2) | (1) | (0) |
| current output | 31 | 30 | 29 | 28 | 27 | 26 | 25 |    |
|      | 24 | 23 | 22 | 21 | 20 | 19 | 18 | 17 |
|      | 16 | 15 | 14 | 13 | 12 | 11 | 10 | 9  |
|      | 8  | 7  | 6  | 1  | 2  | 3  | 4  | 5  |

FIG. 14

|   | T1 (0) | T2 (1) | T3 (2) | T4 (3) | T5 (4) | T6 (5) | T7 (6) | T8 (7) |
|---|---|---|---|---|---|---|---|---|
| current output | 25 | 26 | 27 | 28 | 29 | 30 | 31 | |
| | 17 | 18 | 19 | 20 | 21 | 22 | 23 | 24 |
| | 9 | 10 | 11 | 12 | 13 | 14 | 15 | 16 |
| | 1 | 2 | 3 | 4 | 5 | 6 | 7 | 8 |

FIG. 16

|   | T1 (7) | T2 (6) | T3 (5) | T4 (4) | T5 (3) | T6 (2) | T7 (1) | T8 (0) |
|---|---|---|---|---|---|---|---|---|
| current output | | 31 | 30 | 29 | 28 | 27 | 26 | 25 |
| | 24 | 23 | 22 | 21 | 20 | 19 | 18 | 17 |
| | 16 | 15 | 14 | 13 | 12 | 11 | 10 | 9 |
| | 8 | 7 | 6 | 5 | 4 | 3 | 2 | 1 |

| | T1 (3) | T2 (2) | T3 (1) | T4 (0) | T5 (4) | T6 (5) | T7 (6) | T8 (7) |
|---|---|---|---|---|---|---|---|---|
| current output | 28 | 27 | 26 | 25 | 29 | 30 | 31 | |
| | 20 | 19 | 18 | 17 | 21 | 22 | 23 | 24 |
| | 12 | 11 | 10 | 9 | 13 | 14 | 15 | 16 |
| | 4 | 3 | 2 | 1 | 5 | 6 | 7 | 8 |

FIG. 19

| | T1 (7) | T2 (6) | T3 (5) | T4 (0) | T5 (1) | T6 (2) | T7 (3) | T8 (4) |
|---|---|---|---|---|---|---|---|---|
| current output | | 31 | 30 | 25 | 26 | 27 | 28 | 29 |
| | 24 | 23 | 22 | 17 | 18 | 19 | 20 | 21 |
| | 16 | 15 | 14 | 9 | 10 | 11 | 12 | 13 |
| | 8 | 7 | 6 | 1 | 2 | 3 | 4 | 5 |

|  | | T1 | T2 | T3 | T4 | T5 | T6 | T7 | T8 |
|---|---|---|---|---|---|---|---|---|---|
| t1 | | (7) | (6) | (5) | (0) | (1) | (2) | (3) | (4) |
| t2 | | (0) | (1) | (2) | (3) | (4) | (5) | (6) | (7) |
| current output | | 25 | 26 | 27 | 28 | 29 | 30 | 31 | |
| | | 17 | 18 | 19 | 20 | 21 | 22 | 23 | 24 |
| | | 9 | 10 | 11 | 12 | 13 | 14 | 15 | 16 |
| | | 8 | 7 | 6 | 1 | 2 | 3 | 4 | 5 |

FIG. 21

|  | | T1 | T2 | T3 | T4 | T5 | T6 | T7 | T8 |
|---|---|---|---|---|---|---|---|---|---|
| t1 | | (3) | (2) | (1) | (0) | (4) | (5) | (6) | (7) |
| t2 | | (7) | (6) | (5) | (4) | (3) | (2) | (1) | (0) |
| current output | | | 31 | 30 | 29 | 28 | 27 | 26 | 25 |
| | | 24 | 23 | 22 | 21 | 20 | 19 | 18 | 17 |
| | | 16 | 15 | 14 | 13 | 12 | 11 | 10 | 9 |
| | | 4 | 3 | 2 | 1 | 5 | 6 | 7 | 8 |

FIG. 22

|       | T1  | T2  | T3  | T4  | T5  | T6  | T7  | T8  |
|-------|-----|-----|-----|-----|-----|-----|-----|-----|
| t1    | (3) | (2) | (1) | (0) | (4) | (5) | (6) | (7) |
| t2    | (0) | (1) | (2) | (3) | (4) | (5) | (6) | (7) |
| current output | 25 | 26 | 27 | 28 | 29 | 30 | 31 |    |
|       | 17  | 18  | 19  | 20  | 21  | 22  | 23  | 24  |
|       | 9   | 10  | 11  | 12  | 13  | 14  | 15  | 16  |
|       | 4   | 3   | 2   | 1   | 5   | 6   | 7   | 8   |

FIG. 23

|       | T1  | T2  | T3  | T4  | T5  | T6  | T7  | T8  |
|-------|-----|-----|-----|-----|-----|-----|-----|-----|
| t1    | (7) | (6) | (5) | (0) | (1) | (2) | (3) | (4) |
| t2    | (7) | (6) | (5) | (4) | (3) | (2) | (1) | (0) |
| current output |  | 31 | 30 | 29 | 28 | 27 | 26 | 25 |
|       | 24  | 23  | 22  | 21  | 20  | 19  | 18  | 17  |
|       | 16  | 15  | 14  | 13  | 12  | 11  | 10  | 9   |
|       | 8   | 7   | 6   | 1   | 2   | 3   | 4   | 5   |

FIG. 24

DIMMING METHOD AND CURRENT DRIVING DEVICE

CROSS-REFERENCE TO RELATED APPLICATION

This application claims priority to Taiwanese Patent Application No. 112128676, filed on Jul. 31, 2023, and incorporated by reference herein in its entirety.

FIELD

The disclosure relates to dimming techniques, and more particularly to a dimming method and a current driving device.

BACKGROUND

A first conventional current driving device for driving a light emitting diode (LED) string includes a current source and a switch that are coupled to the LED string in series. The current source generates a drive current with a fixed magnitude. The switch receives a control signal with a variable pulse width, and switches between conduction and non-conduction based on the control signal. Within each pulse of the control signal, the switch conducts, the drive current flows through the LED string, and the LED string emits light with fixed intensity. Outside each pulse of the control signal, the switch does not conduct, no current flows through the LED string, and the LED string does not emit light. Therefore, average brightness of the LED string in a switching cycle of the control signal is linearly correlated to the pulse width of the control signal. For the first conventional current driving device, only a frequency of a clock signal that is used to generate the control signal can be increased to enhance the average brightness resolution of the LED string. However, when the frequency of the clock signal is too high, the linear correlation between the pulse width of the control signal and the average brightness of the LED string would be degraded because of transient response characteristics of the LED string.

A second conventional current driving device for driving an LED string includes a controlled current source coupled to the LED string, and a signal combiner coupled to the controlled current source. The signal combiner receives a pulse dimming signal and a magnitude dimming signal that are generated from a brightness value, and combines the pulse dimming signal and the magnitude dimming signal into a control signal for controlling the controlled current source. The control signal has a pulse width correlated to the pulse dimming signal, and a constant pulse height correlated to the magnitude dimming signal. The controlled current source switches, based on the control signal, between generating a drive current that flows through the LED string and not generating the drive current. Within each pulse of the control signal, the drive current is generated and has a constant magnitude correlated to the pulse height of the control signal, and the LED string emits light with constant intensity correlated to the magnitude of the drive current. Outside each pulse of the control signal, the drive current is not generated, and the LED string does not emit light. Therefore, average brightness of the LED string in a switching cycle of the control signal is correlated to the brightness value. For the second conventional current driving device, although the magnitude of the drive current is modulated to enhance the average brightness resolution of the LED string, the pulse dimming signal and the magnitude dimming signal have to be combined into the control signal.

SUMMARY

Therefore, an object of the disclosure is to provide a dimming method and a current driving device that can alleviate at least one of the drawbacks of the prior art.

According to an aspect of the disclosure, the dimming method is to be implemented by a brightness divider of a current driving device. The current driving device further includes a current generator and a switch. The dimming method includes steps of: (A) determining whether a brightness value is smaller than or equal to a predetermined reference value; (B) when it is determined in step (A) that the brightness value is smaller than or equal to the predetermined reference value, setting a magnitude value that is related to the current generator, and setting a pulse width value that is related to the switch based on the brightness value; and (C) when it is determined in step (A) that the brightness value is not smaller than or equal to the predetermined reference value, setting the magnitude value based on the brightness value, the predetermined reference value and a predetermined order setting, and setting the pulse width value based on the predetermined reference value.

According to another aspect of the disclosure, the current driving device is adapted to drive a light emitting element based on a brightness value, and includes a switch, a current generator and a brightness divider. The switch is adapted to be coupled to the light emitting element, receives a pulse signal, and switches between conduction and non-conduction based on the pulse signal. The switch conducts within each pulse of the pulse signal, and does not conduct outside each pulse of the pulse signal. The current generator is coupled to the switch, receives a magnitude control signal, and generates a drive current based on the magnitude control signal. The drive current has a magnitude related to the magnitude control signal, and flows through the light emitting element when the switch conducts. The brightness divider is coupled to the switch and the current generator, receives the brightness value, and determines whether the brightness value is smaller than or equal to a predetermined reference value. When it is determined that the brightness value is smaller than or equal to the predetermined reference value, the brightness divider sets a magnitude value, and sets a pulse width value based on the brightness value. When it is determined that the brightness value is not smaller than or equal to the predetermined reference value, the brightness divider sets the magnitude value based on the brightness value, the predetermined reference value and a predetermined order setting, and sets the pulse width value based on the predetermined reference value. The brightness divider generates the magnitude control signal for receipt by the current generator based on the magnitude value, and generates the pulse signal for receipt by the switch based on the pulse width value.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 3 is an exemplary timing diagram illustrating the embodiment generating a current output based on the first implementation of the dimming method and a first example of a predetermined order setting.

FIG. 4 is an exemplary timing diagram illustrating the embodiment generating the current output based on the first implementation of the dimming method and a second example of the predetermined order setting.

FIG. 5 is an exemplary timing diagram illustrating the embodiment generating the current output based on the first implementation of the dimming method and a third example of the predetermined order setting.

FIG. 6 is an exemplary timing diagram illustrating the embodiment generating the current output based on the first implementation of the dimming method and a fourth example of the predetermined order setting.

FIG. 11 is an exemplary timing diagram illustrating the embodiment generating the current output based on the second implementation of the dimming method and a first example of a combination of a first predetermined order setting and a second predetermined order setting.

FIG. 12 is an exemplary timing diagram illustrating the embodiment generating the current output based on the second implementation of the dimming method and a second example of the combination of the first predetermined order setting and the second predetermined order setting.

FIG. 13 is an exemplary timing diagram illustrating the embodiment generating the current output based on the second implementation of the dimming method and a third example of the combination of the first predetermined order setting and the second predetermined order setting.

FIG. 14 is an exemplary timing diagram illustrating the embodiment generating the current output based on the second implementation of the dimming method and a fourth example of the combination of the first predetermined order setting and the second predetermined order setting.

FIG. 16 is an exemplary timing diagram illustrating the embodiment generating the current output based on the third implementation of the dimming method and the first example of the predetermined order setting.

FIG. 17 is an exemplary timing diagram illustrating the embodiment generating the current output based on the third implementation of the dimming method and the second example of the predetermined order setting.

FIG. 18 is an exemplary timing diagram illustrating the embodiment generating the current output based on the third implementation of the dimming method and the third example of the predetermined order setting.

FIG. 19 is an exemplary timing diagram illustrating the embodiment generating the current output based on the third implementation of the dimming method and the fourth example of the predetermined order setting.

FIG. 21 is an exemplary timing diagram illustrating the embodiment generating the current output based on the fourth implementation of the dimming method and the first example of the combination of the first predetermined order setting and the second predetermined order setting.

FIG. 22 is an exemplary timing diagram illustrating the embodiment generating the current output based on the fourth implementation of the dimming method and the second example of the combination of the first predetermined order setting and the second predetermined order setting.

FIG. 23 is an exemplary timing diagram illustrating the embodiment generating the current output based on the fourth implementation of the dimming method and the third example of the combination of the first predetermined order setting and the second predetermined order setting.

FIG. 24 is an exemplary timing diagram illustrating the embodiment generating the current output based on the fourth implementation of the dimming method and the fourth example of the combination of the first predetermined order setting and the second predetermined order setting.

DETAILED DESCRIPTION

Figure 1:
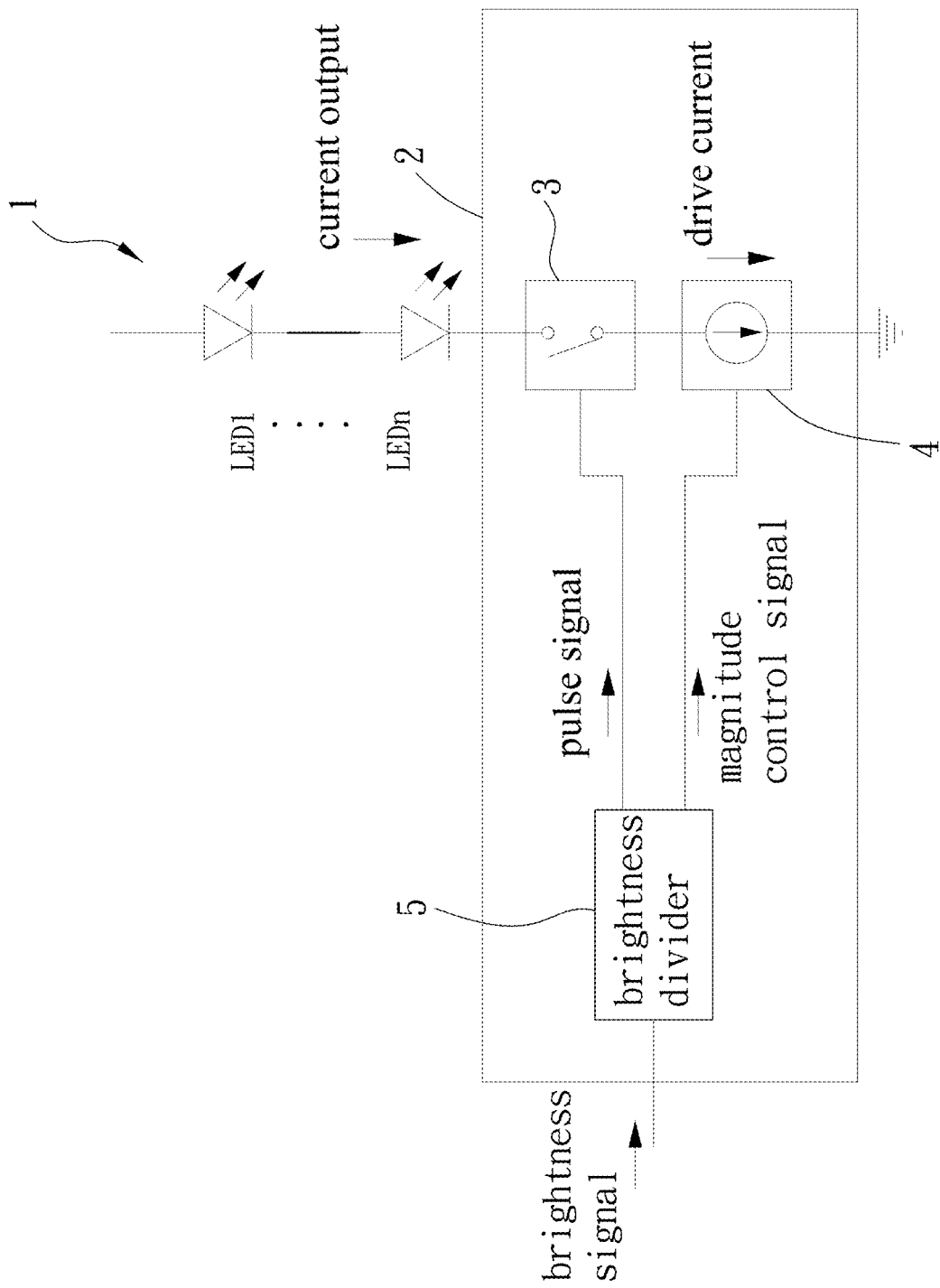
FIG. 1 is a circuit block diagram illustrating an embodiment of a current driving device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a current driving device 2 according to the disclosure is adapted to drive a light emitting element 1 based on a brightness value, and includes a switch 3, a current generator 4 and a brightness divider 5. In this embodiment, the light emitting element 1 is a light emitting diode (LED) string that includes multiple LEDs (LED1-LEDn) of the same color or different colors (e.g., red, green, blue, white, etc.). However, in other embodiments, the light emitting element 1 may be a single LED.

The switch 3 is adapted to be coupled to the light emitting element 1, receives a pulse signal, and switches between conduction and non-conduction based on the pulse signal. The switch 3 conducts within each pulse of the pulse signal, and does not conduct outside each pulse of the pulse signal.

The current generator 4 is coupled to the switch 3, receives a magnitude control signal, and generates a drive current based on the magnitude control signal. The drive current has a magnitude related to the magnitude control signal. When the switch 3 conducts, the drive current flows through the light emitting element 1, and the light emitting element 1 emits light with intensity related to the magnitude of the drive current. When the switch 3 does not conduct, no current flows through the light emitting element 1, and the light emitting element 1 does not emit light. In other words, a current output provided by the current driving device 2 to drive the light emitting element 1 has a magnitude that is equal to the magnitude of the drive current when the switch 3 conducts, and that is zero when the switch 3 does not conduct.

The brightness divider 5 is coupled to the switch 3 and the current generator 4, receives a brightness signal containing the brightness value, and generates the pulse signal and the magnitude control signal based on the brightness value for receipt by the switch 3 and the current generator 4 such that average brightness of the light emitting element 1 in a switching cycle of the pulse signal is related to the brightness value.

Figure 2:
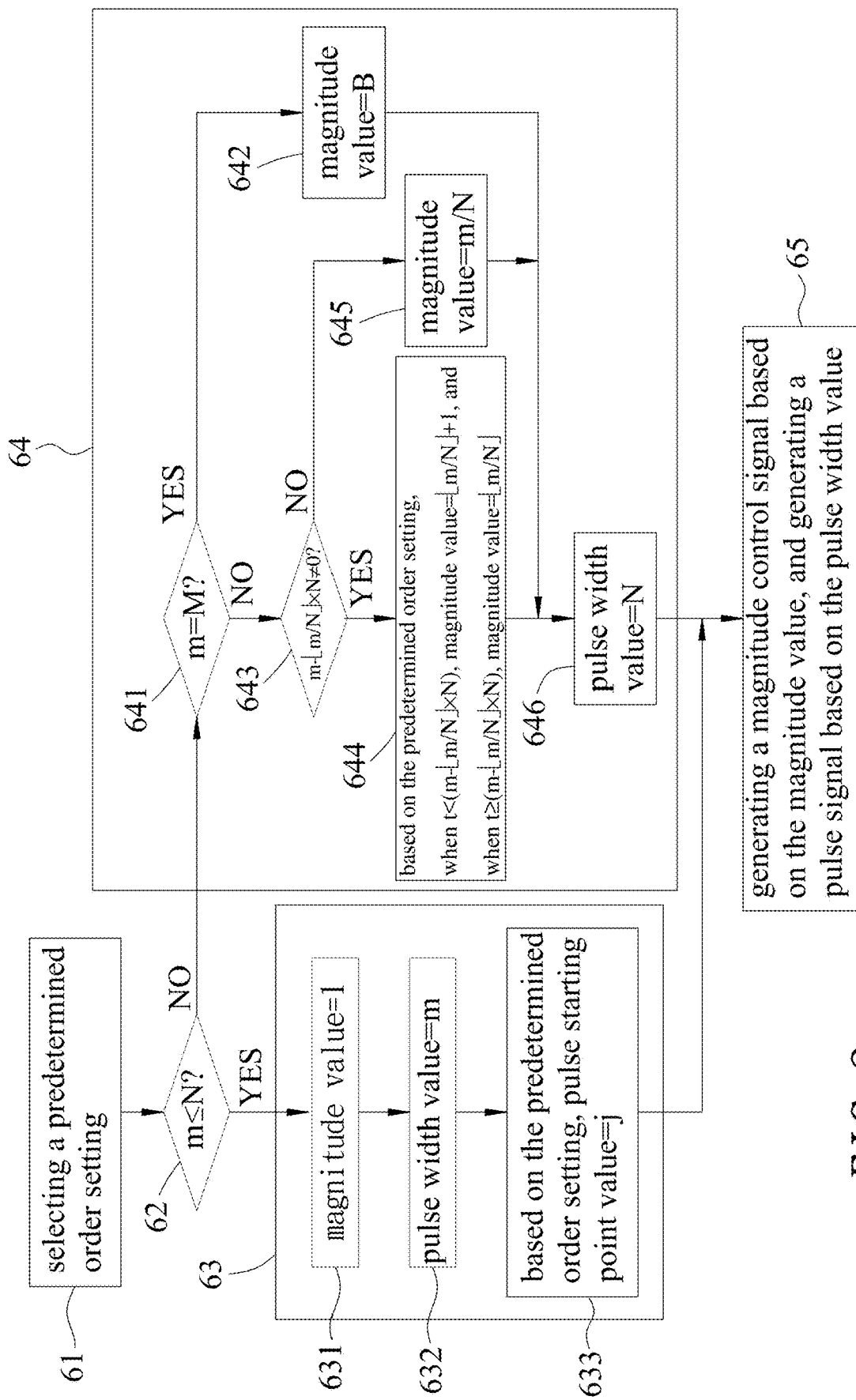
FIG. 2 is a flow chart illustrating a first implementation of a dimming method performed by the embodiment.
Figures 3, 4:
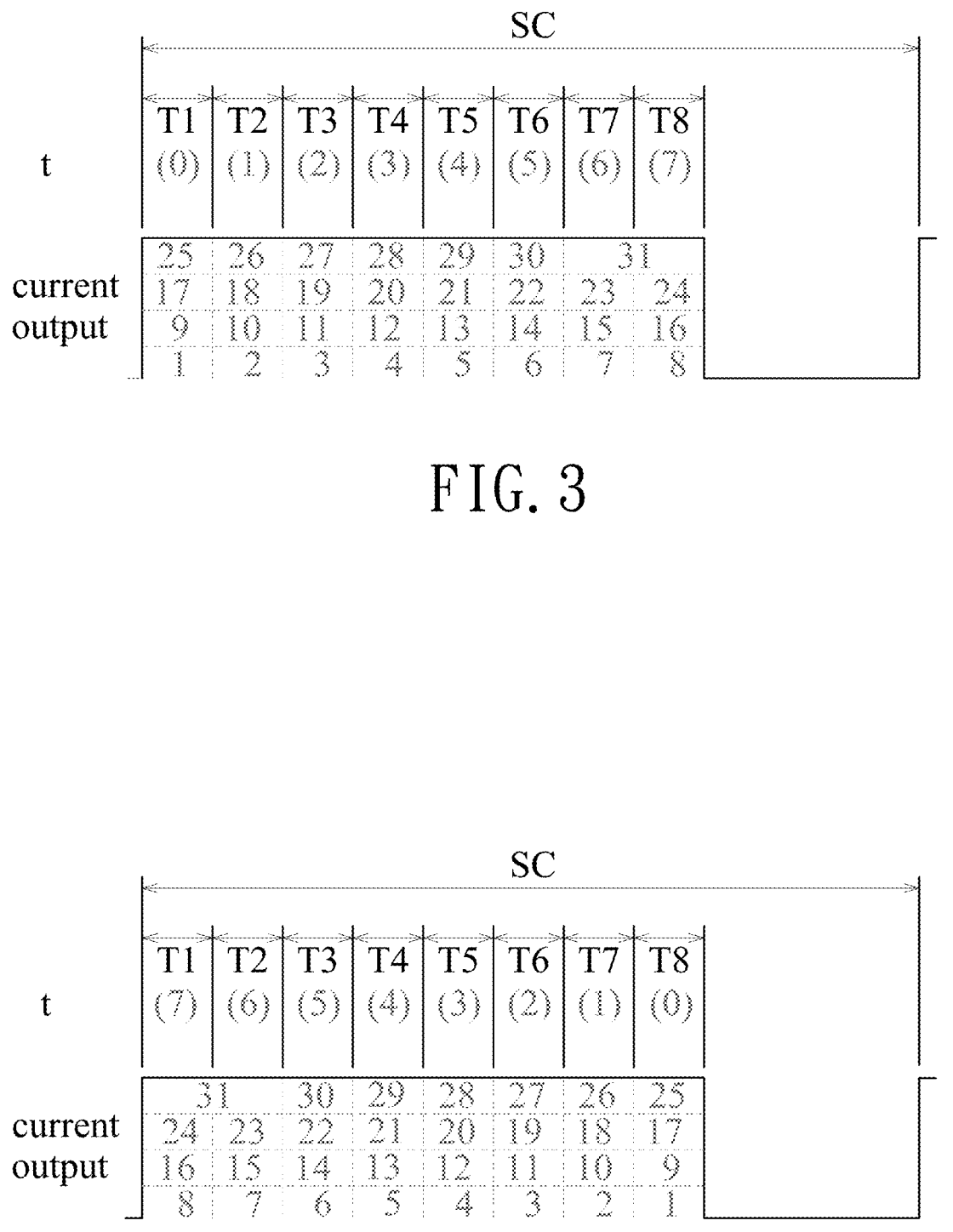

Referring to FIGS. 1 to 3, a first implementation of a dimming method performed by the brightness divider 5 includes steps 61-65.

In step 61, the brightness divider 5 selects one of multiple order settings stored therein to serve as a predetermined order setting. As shown in FIG. 3, each switching cycle (SC) of the current output (concurrent with a respective switching cycle of the pulse signal) includes multiple time intervals. In this embodiment, each switching cycle (SC) of the current output includes eight time intervals (T1-T8), and an $(i+1)^{th}$ one (Ti+1) of the time intervals (T1-T8) comes after/follows an $i^{th}$ one (Ti) of the time intervals (T1-T8), where $1 \leq i \leq 7$. Each of the order settings stored in the brightness divider 5 indicates respective order numbers (t) of the time intervals (T1-T8). FIG. 3 depicts an example where the order numbers (t) of the time intervals (T1-T8) as indicated by the predetermined order setting are respectively 0, 1, 2, 3, 4, 5, 6 and 7. FIG. 4 depicts an example where the order numbers (t) of the time intervals (T1-T8) as indicated by the predetermined order setting are respectively 7, 6, 5, 4, 3, 2, 1 and 0. FIG. 5 depicts an example where the order numbers (t) of the time intervals (T1-T8) as indicated by the predetermined order setting are respectively 3, 2, 1, 0, 4, 5, 6 and 7. FIG. 6 depicts an example where the order numbers (t) of the time intervals (T1-T8) as indicated by the predetermined order setting are respectively 7, 6, 5, 0, 1, 2, 3 and 4.

In step 62, the brightness divider 5 determines whether the brightness value (m) is smaller than or equal to a first predetermined reference value (N). The first predetermined reference value (N) is equal to a total number of the time intervals (T1-T8) of each switching cycle (SC) of the current output, and is eight in this embodiment. If a result of the determination is affirmative, the flow proceeds to step 63. If the result of the determination is negative, the flow proceeds to step 64.

In step 63, the brightness divider 5 sets a magnitude value that is related to the magnitude control signal, sets a pulse width value that is related to the pulse signal based on the brightness value (m), and sets a pulse starting point value that is related to the pulse signal based on the brightness value (m) and the predetermined order setting. Then, the flow proceeds to step 65.

To be specific, step 63 includes sub-steps 631-633.

In sub-step 631, the brightness divider 5 sets the magnitude value to be equal to one.

In sub-step 632, the brightness divider 5 sets the pulse width value to be equal to the brightness value (m).

In sub-step 633, the brightness divider 5 sets the pulse starting point value to be equal to a number (j), where a $j^{th}$ one (Tj) of the time intervals (T1-T8) is an earliest one of at least one of the time intervals (T1-T8), the order number (t) of which as indicated by the predetermined order setting is smaller than the brightness value (m). In an example where the brightness value (m) is five and the order numbers (t) of the time intervals (T1-T8) as indicated by the predetermined order setting are respectively 7, 6, 5, 0, 1, 2, 3 and 4, the order numbers (t) of the time intervals (T4-T8) as indicated by the predetermined order are smaller than the brightness value (m), and an earliest one of the time intervals (T4-T8) is the time interval (T4), so the number (j) is four.

In step 64, the brightness divider 5 sets the magnitude value based on the brightness value (m), the first predetermined reference value (N) and the predetermined order setting, and sets the pulse width value based on the first predetermined reference value (N).

To be specific, step 64 includes sub-steps 641-646.

In sub-step 641, the brightness divider 5 determines whether the brightness value (m) is equal to an upper limit (M) of the brightness value (m), where the upper limit (M) of the brightness value (m) is equal to a product of the first predetermined reference value (N) and a second predetermined reference value (B) minus one (i.e., M=N×B−1). If a result of the determination is affirmative, the flow proceeds to sub-step 642. If the result of the determination is negative, the flow proceeds to sub-step 643. In this embodiment, the second predetermined reference value (B) is four, and the upper limit (M) of the brightness value (m) is thirty-one.

In sub-step 642, the brightness divider 5 sets the magnitude value to be equal to the second predetermined reference value (B). Then, the flow proceeds to sub-step 646.

In sub-step 643, the brightness divider 5 determines whether a remainder of the brightness value (m) divided by the first predetermined reference value (N) (i.e., $m - \lfloor m/N \rfloor \times N$) is non-zero. If a result of the determination is affirmative, the flow proceeds to sub-step 644. If the result of the determination is negative, the flow proceeds to sub-step 645.

In sub-step 644, with respect to each of the time intervals (T1-T8), the brightness divider 5 sets the magnitude value to be equal to a quotient of the brightness value (m) divided by the first predetermined reference value (N) plus one (i.e., $\lfloor m/N \rfloor + 1$) in a case where the order number (t) of the time interval as indicated by the predetermined order setting is smaller than the remainder of the brightness value (m) divided by the first predetermined reference value (N), and to be equal to the quotient of the brightness value (m) divided by the first predetermined reference value (N) (i.e., $\lfloor m/N \rfloor$) in a case where the order number (t) of the time interval as indicated by the predetermined order setting is greater than or equal to the remainder of the brightness value (m) divided by the first predetermined reference value (N). Then, the flow proceeds to sub-step 646.

In sub-step 645, the brightness divider 5 sets the magnitude value to be equal to the brightness value (m) divided by the first predetermined reference value (N) (i.e., m/N).

In sub-step 646, the brightness divider 5 sets the pulse width value to be equal to the first predetermined reference value (N).

In step 65, the brightness divider 5 generates the magnitude control signal based on the magnitude value. In addition, the brightness divider 5 generates the pulse signal based on the pulse width value in a case where the pulse width value is equal to the first predetermined reference value (N), and generates the pulse signal based on the pulse width value and the pulse starting point value in a case where the pulse width value is smaller than the first predetermined reference value (N).

Therefore, when the brightness value (m) falls within a range of from one to eight, sub-steps 631-633 are executed to set the magnitude value, the pulse width value and the pulse starting point value. When the brightness value (m) is thirty-one, sub-steps 642, 646 are executed to set the magnitude value and the pulse width value. When the brightness value (m) falls within one of a range of from nine to fifteen, a range of from seventeen to twenty-three, and a rage of from twenty-five to thirty, sub-steps 644, 646 are executed to set the magnitude value and the pulse width value. When the brightness value (m) is one of sixteen and twenty-four, sub-steps 645, 646 are executed to set the magnitude value and the pulse width value.

Figure 7:
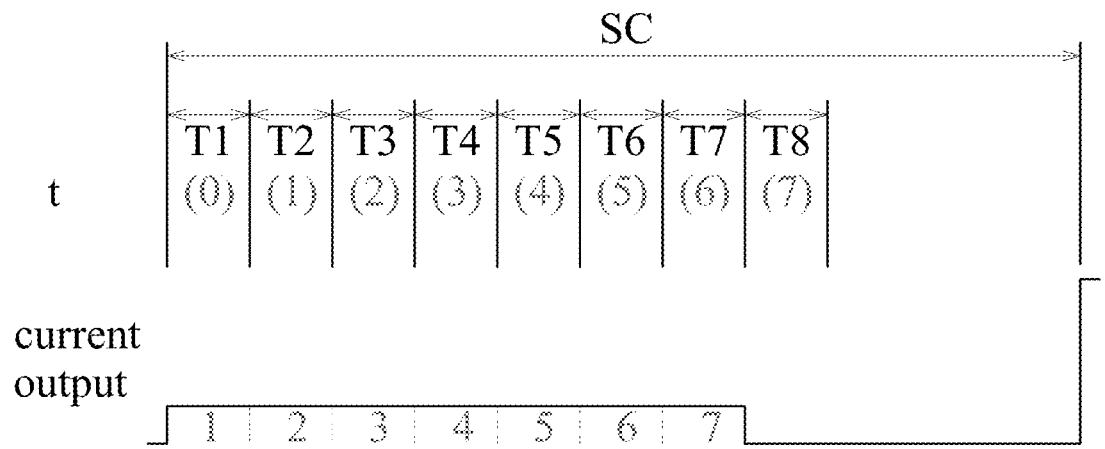
FIGS. 7 to 9 are exemplary timing diagrams illustrating the embodiment generating the current output based on the first implementation of the dimming method and the first example of the predetermined order setting for various brightness values.
Figure 8:
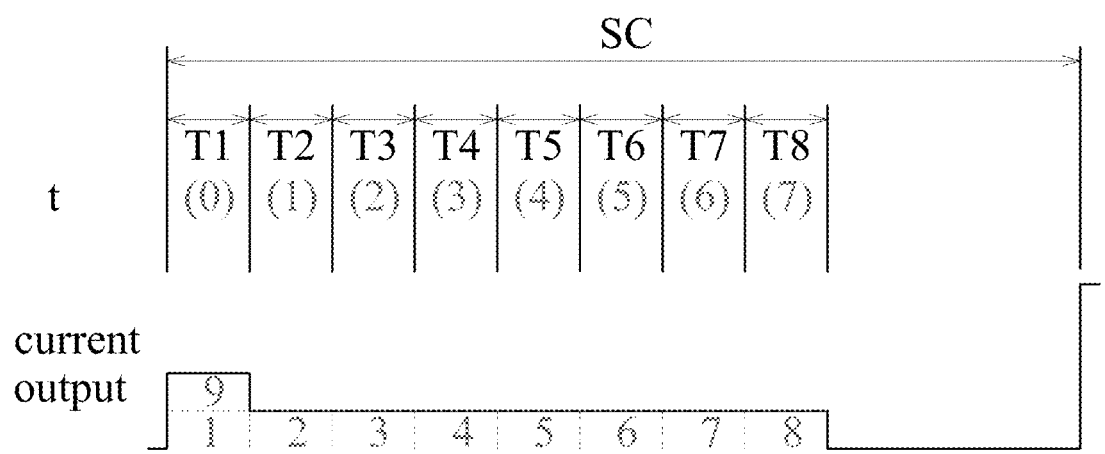
Figure 9:
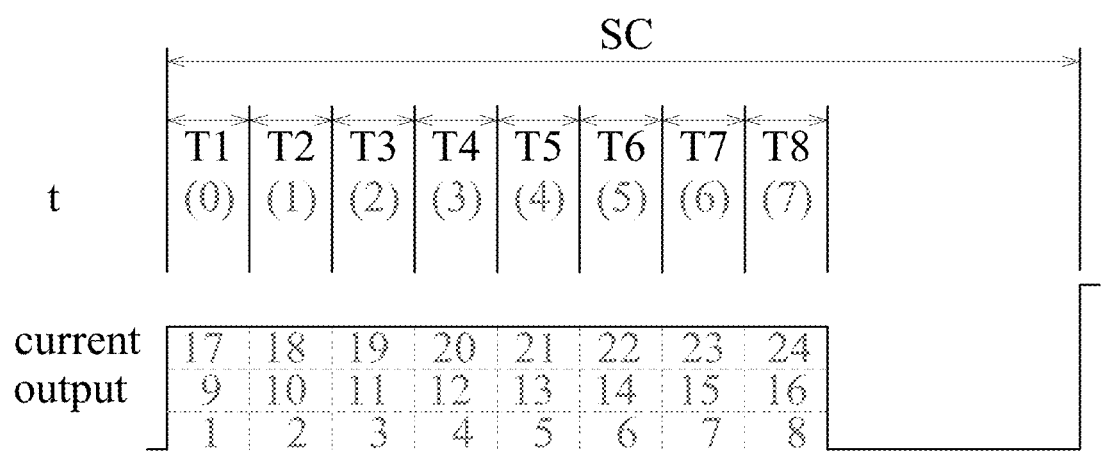

FIGS. 3 and 7 to 9 depict an example where the order numbers (t) of the time intervals (T1-T8) as indicated by the predetermined order setting are respectively 0, 1, 2, 3, 4, 5, 6 and 7. As shown in FIG. 3, when the brightness value (m)

is thirty-one, the magnitude value is set to be equal to four, the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and that the drive current generated by the current generator 4 causes the current output to ideally have a constant magnitude of four times a predetermined current value within the pulse of the current output. As shown in FIG. 7, when the brightness value (m) is seven, the magnitude value is set to be equal to one, the pulse width value is set to be equal to seven, the pulse starting point value is set to be equal to one, and the magnitude control signal and the pulse signal are generated based on the magnitude value, the pulse width value and the pulse starting point value in such a way that the switching of the switch 3 causes the pulse of the current output to ideally span seven of the time intervals (T1-T8) that include the first to seventh ones (T1-T7) of the time intervals (T1-T8), and the drive current generated by the current generator 4 causes the current output to ideally have a constant magnitude of the predetermined current value within the pulse of the current output. As shown in FIG. 8, when the brightness value (m) is nine, the magnitude value is set to be equal to two with respect to the first one (T1) of the time intervals (T1-T8) and to be equal to one with respect to the second to eighth ones (T2-T8) of the time intervals (T1-T8), the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and the drive current generated by the current generator 4 causes the current output to ideally have a magnitude that is two times the predetermined current value during the first one (T1) of the time intervals (T1-T8) and that is equal to the predetermined current value during the second to eighth ones (T2-T8) of the time intervals (T1-T8). As shown in FIG. 9, when the brightness value (m) is twenty-four, the magnitude value is set to be equal to three, and the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and the drive current generated by the current generator 4 causes the current output to ideally have a constant magnitude that is three times the predetermined current value within the pulse of the current output.

Figure 10:
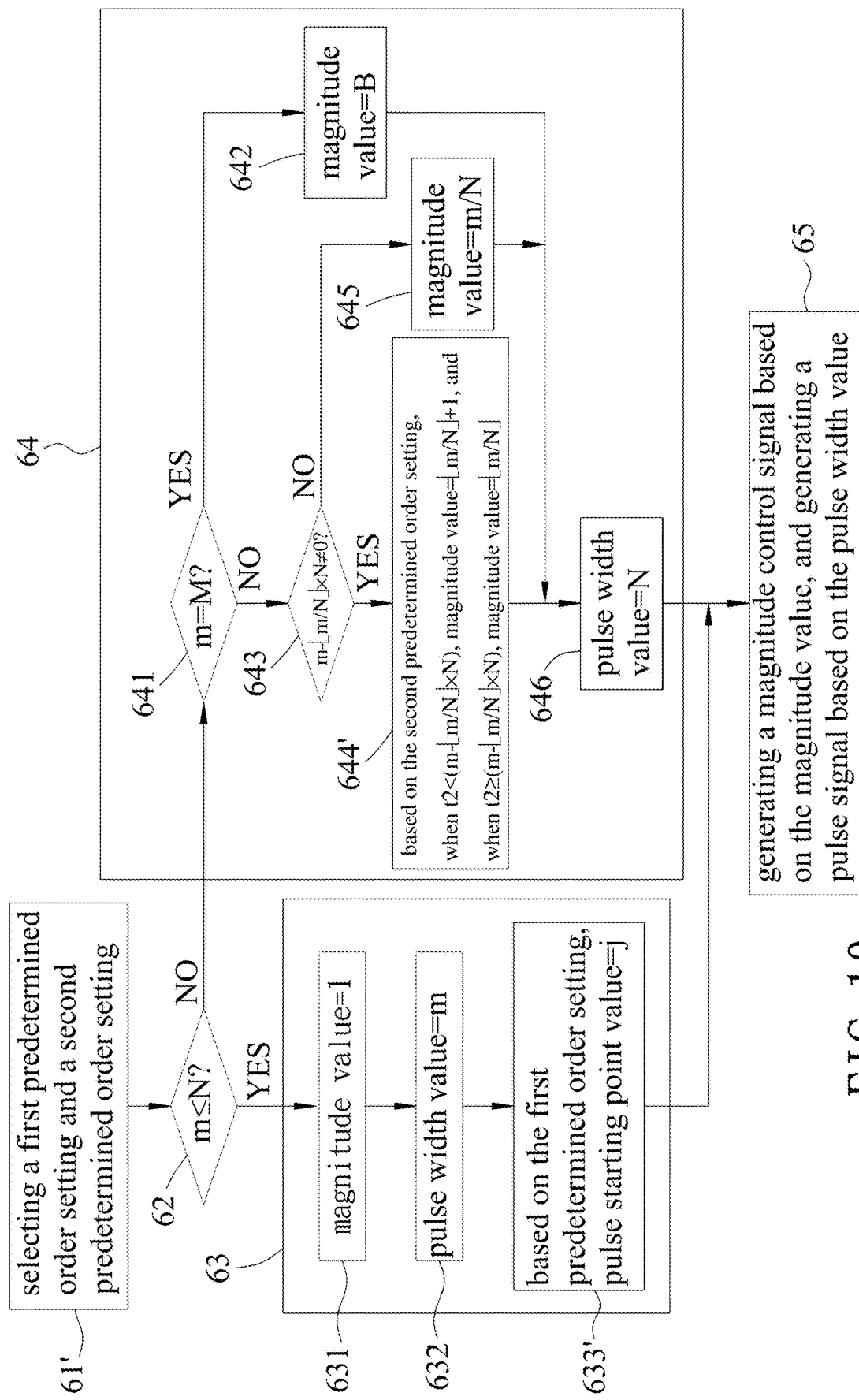
FIG. 10 is a flow chart illustrating a second implementation of the dimming method.

Referring to FIGS. 1, 10 and 11, a second implementation of the dimming method performed by the brightness divider 5 is similar to the first implementation of the dimming method, but differs from the first implementation of the dimming method in what will be described below.

In step 61', the brightness divider 5 selects two of the order settings stored therein to respectively serve as a first predetermined order setting and a second predetermined order setting. FIG. 11 depicts an example where the order numbers (t1) of the time intervals (T1-T8) as indicated by the first predetermined order setting are respectively 7, 6, 5, 0, 1, 2, 3 and 4, and the order numbers (t2) of the time intervals (T1-T8) as indicated by the second predetermined order setting are respectively 0, 1, 2, 3, 4, 5, 6 and 7. FIG. 12 depicts an example where the order numbers (t1) of the time intervals (T1-T8) as indicated by the first predetermined order setting are respectively 3, 2, 1, 0, 4, 5, 6 and 7, and the order numbers (t2) of the time intervals (T1-T8) as indicated by the second predetermined order setting are respectively 7, 6, 5, 4, 3, 2, 1 and 0. FIG. 13 depicts an example where the order numbers (t1) of the time intervals (T1-T8) as indicated by the first predetermined order setting are respectively 3, 2, 1, 0, 4, 5, 6 and 7, and the order numbers (t2) of the time intervals (T1-T8) as indicated by the second predetermined order setting are respectively 0, 1, 2, 3, 4, 5, 6 and 7. FIG. 14 depicts an example where the order numbers (t1) of the time intervals (T1-T8) as indicated by the first predetermined order setting are respectively 7, 6, 5, 0, 1, 2, 3 and 4, and the order numbers (t2) of the time intervals (T1-T8) as indicated by the second predetermined order setting are respectively 7, 6, 5, 4, 3, 2, 1 and 0.

In sub-step 633', the brightness divider 5 sets the pulse starting point value to be equal to a number (j), where a $j^{th}$ one (Tj) of the time intervals (T1-T8) is an earliest one of at least one of the time intervals (T1-T8), the order number (t1) of which as indicated by the first predetermined order setting is smaller than the brightness value (m).

In sub-step 644', with respect to each of the time intervals (T1-T8), the brightness divider 5 sets the magnitude value to be equal to the quotient of the brightness value (m) divided by the first predetermined reference value (N) plus one (i.e., $\lfloor m/N \rfloor + 1$) in a case where the order number (t2) of the time interval as indicated by the second predetermined order setting is smaller than the remainder of the brightness value (m) divided by the first predetermined reference value (N) (i.e., $m - \lfloor m/N \rfloor \times N$), and to be equal to the quotient of the brightness value (m) divided by the first predetermined reference value (N) (i.e., $\lfloor m/N \rfloor$) in a case where the order number (t2) of the time interval as indicated by the second predetermined order setting is greater than or equal to the remainder of the brightness value (m) divided by the first predetermined reference value (N).

Figure 15:
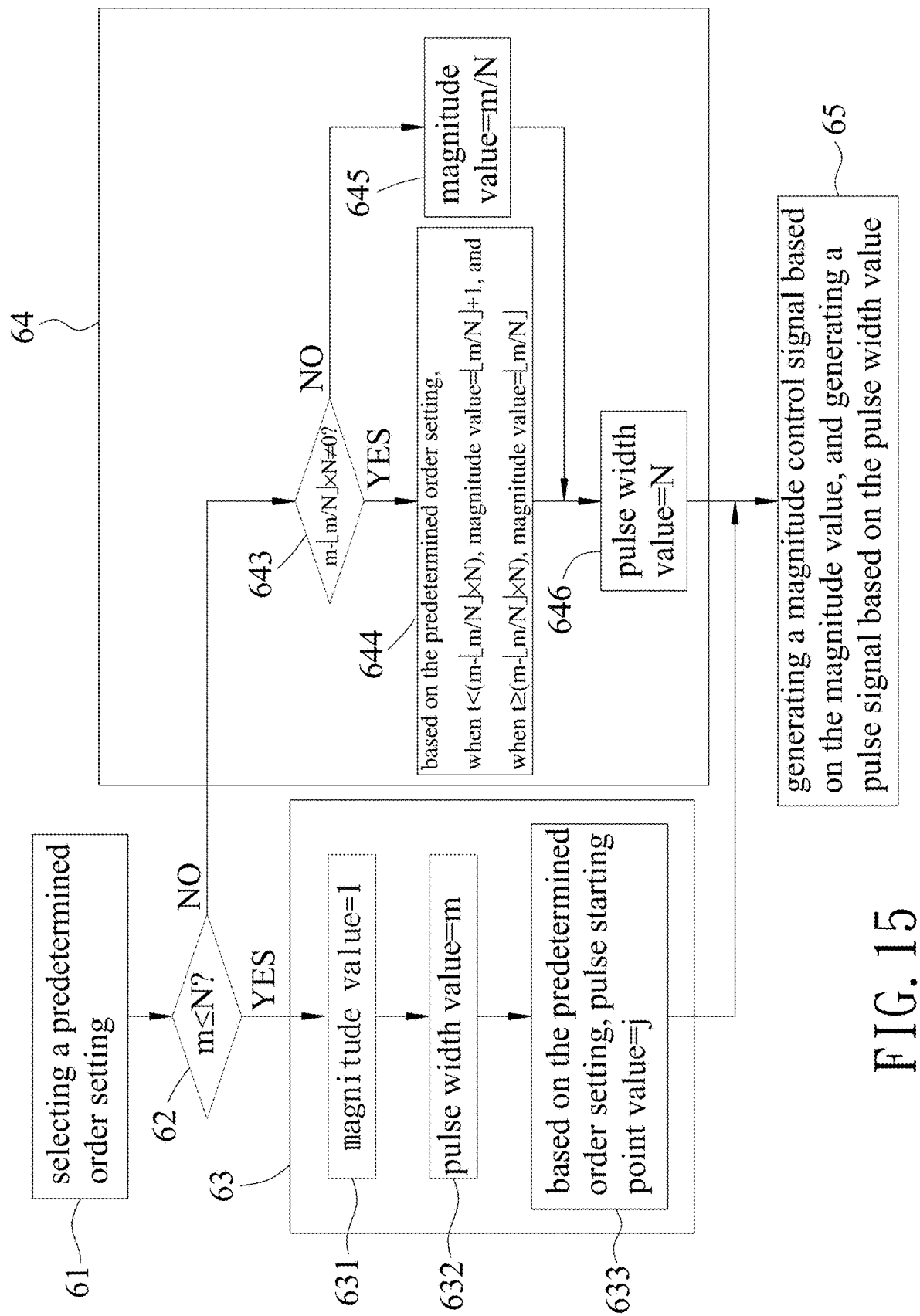
FIG. 15 is a flow chart illustrating a third implementation of the dimming method.

Referring to FIGS. 1 and 15, a third implementation of the dimming method performed by the brightness divider 5 is similar to the first implementation of the dimming method, but differs from the first implementation of the dimming method in that sub-steps 641, 642 (see FIG. 2) are omitted, and that the flow proceeds to sub-step 643 if the result of the determination in step 62 is negative. Therefore, in the third implementation of the dimming method, when the brightness value (m) is thirty-one, sub-steps 644, 646 are executed to set the magnitude value and the pulse width value.

FIG. 16 depicts an example where the order numbers (t) of the time intervals (T1-T8) as indicated by the predetermined order setting are respectively 0, 1, 2, 3, 4, 5, 6 and 7. FIG. 17 depicts an example where the order numbers (t) of the time intervals (T1-T8) as indicated by the predetermined order are respectively 7, 6, 5, 4, 3, 2, 1 and 0. FIG. 18 depicts an example where the order numbers (t) of the time intervals (T1-T8) as indicated by the predetermined order are respectively 3, 2, 1, 0, 4, 5, 6 and 7. FIG. 19 depicts an example where the order numbers (t) of the time intervals (T1-T8) as indicated by the predetermined order are respectively 7, 6, 5, 0, 1, 2, 3 and 4. As shown in FIGS. 16 and 18, when the brightness value (m) is thirty-one, the magnitude value is set to be equal to four with respect to the first to seventh ones (T1-T7) of the time intervals (T1-T8) and to be equal to three with respect to the eighth one (T8) of the time intervals (T1-T8), the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and the drive current generated by the current generator 4 causes the current output to ideally have a magnitude that is four times the predetermined current value during the first to seventh ones (T1-T7) of the time intervals (T1-T8) and that is three times the predetermined current value during the eighth one (T8) of the time intervals (T1-T8). As shown in FIGS. 17 and 19, when the brightness value (m) is thirty-one, the magnitude value is set to be equal to four with respect to the second to eighth ones (T2-T8) of the time intervals (T1-T8) and to be equal to three with respect to the first one (T1) of the time intervals (T1-T8), the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and the drive current generated by the current generator 4 causes the current output to ideally have a magnitude that is four times the predetermined current value during the second to eighth ones (T2-T8) of the time intervals (T1-T8) and that is three times the predetermined current value during the first one (T1) of the time intervals (T1-T8).

Figure 20:
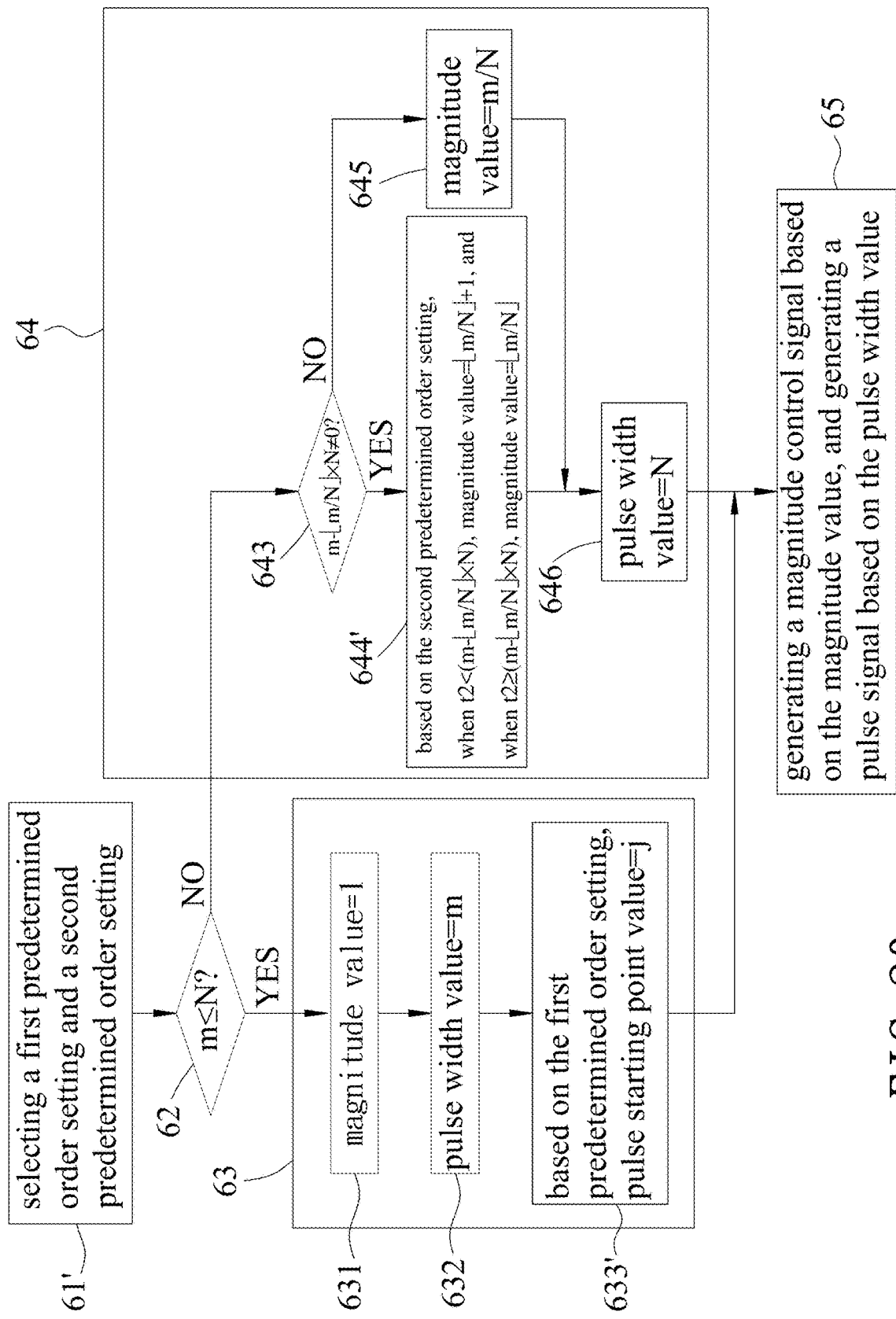
FIG. 20 is a flow chart illustrating a fourth implementation of the dimming method.

Referring to FIGS. 1 and 20, a fourth implementation of the dimming method performed by the brightness divider 5 is similar to the second implementation of the dimming method, but differs from the second implementation of the dimming method in that sub-steps 641, 642 (see FIG. 10) are omitted, and that the flow proceeds to sub-step 643 if the result of the determination in step 62 is negative. Therefore, in the fourth implementation of the dimming method, when the brightness value (m) is thirty-one, sub-steps 644', 646 are executed.

FIG. 21 depicts an example where the order numbers (t1) of the time intervals (T1-T8) as indicated by the first predetermined order setting are respectively 7, 6, 5, 0, 1, 2, 3 and 4, and the order numbers (t2) of the time intervals (T1-T8) as indicated by the second predetermined order setting are respectively 0, 1, 2, 3, 4, 5, 6 and 7. FIG. 22 depicts an example where the order numbers (t1) of the time intervals (T1-T8) as indicated by the first predetermined order setting are respectively 3, 2, 1, 0, 4, 5, 6 and 7, and the order numbers (t2) of the time intervals (T1-T8) as indicated by the second predetermined order setting are respectively 7, 6, 5, 4, 3, 2, 1 and 0. FIG. 23 depicts an example where the order numbers (t1) of the time intervals (T1-T8) as indicated by the first predetermined order setting are respectively 3, 2, 1, 0, 4, 5, 6 and 7, and the order numbers (t2) of the time intervals (T1-T8) as indicated by the second predetermined order setting are respectively 0, 1, 2, 3, 4, 5, 6 and 7. FIG. 24 depicts an example where the order numbers (t1) of the time intervals (T1-T8) as indicated by the first predetermined order setting are respectively 7, 6, 5, 0, 1, 2, 3 and 4, and the order numbers (t2) of the time intervals (T1-T8) as indicated by the second predetermined order setting are respectively 7, 6, 5, 4, 3, 2, 1 and 0. As shown in FIGS. 21 and 23, when the brightness value (m) is thirty-one, the magnitude value is set to be equal to four with respect to the first to seventh ones (T1-T7) of the time intervals (T1-T8) and to be equal to three with respect to the eighth one (T8) of the time intervals (T1-T8), the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and the drive current generated by the current generator 4 causes the current output to ideally have a magnitude that is four times the predetermined current value during the first to seventh ones (T1-T7) of the time intervals (T1-T8) and that is three-times the predetermined current value during the eighth one (T8) of the time intervals (T1-T8). As shown in FIGS. 22 and 24, when the brightness value (m) is thirty-one, the magnitude value is set to be equal to four with respect to the second to eighth ones (T2-T8) of the time intervals (T1-T8) and to be equal to three with respect to the first one (T1) of the time intervals (T1-T8), the pulse width value is set to be equal to eight, and the magnitude control signal and the pulse signal are generated based on the magnitude value and the pulse width value in such a way that the switching of the switch 3 causes the pulse of the current output to ideally span the eight time intervals (T1-T8), and the drive current generated by the current generator 4 causes the current output to ideally have a magnitude that is four times the predetermined current value during the second to eighth ones (T2-T8) of the time intervals (T1-T8) and that is three times the predetermined current value during the first one (T1) of the time intervals (T1-T8).

Referring back to FIG. 1, in view of the above, the current driving device of this embodiment has the following advantages.

1. By virtue of the switch 3 switching between conduction and non-conduction based on the pulse signal, by virtue of the current generator 4 generating the drive current based on the magnitude control signal, and by virtue of the brightness divider 5 generating the pulse signal and the magnitude control signal based on the brightness value, the average brightness resolution of the light emitting element 1 can be enhanced by modulating the magnitude control signal while keeping unchanged a frequency of a clock signal that is used to generate the pulse signal, and it is not necessary to combine the pulse signal and the magnitude control signal into a single signal.

2. By virtue of the brightness divider 5 performing the dimming method, a maximum magnitude of the current output in a switching cycle of the current output can be small. This is beneficial for reducing electromagnetic interference, abnormal sound and flickering of the light emitting element 1, and enhancing dimming linearity of the light emitting element 1 (i.e., linear correlation between the brightness value and the average brightness of the emitting element 1).

3. By virtue of the brightness divider 5 modulating any one of the pulse signal and the magnitude control signal, the average brightness of the light emitting element 1 can be changed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A dimming method to be implemented by a brightness divider of a current driving device, the current driving device further including a current generator and a switch, said dimming method comprising steps of:
    (A) determining whether a brightness value is smaller than or equal to a first predetermined reference value;
    (B) when it is determined in step (A) that the brightness value is smaller than or equal to the first predetermined reference value, setting a magnitude value that is related to the current generator, and setting a pulse width value that is related to the switch based on the brightness value; and
    (C) when it is determined in step (A) that the brightness value is not smaller than or equal to the first predetermined reference value, setting the magnitude value based on the brightness value, the first predetermined reference value and a first predetermined order setting, and setting the pulse width value based on the first predetermined reference value.

2. The dimming method as claimed in claim 1, further comprising a step of selecting one of multiple order settings to serve as the first predetermined order setting.

3. The dimming method as claimed in claim 1, wherein step (B) includes sub-steps of:
    (B1) setting the magnitude value to be equal to one; and
    (B2) setting the pulse width value to be equal to the brightness value.

4. The dimming method as claimed in claim 1, wherein step (B) further includes setting a pulse starting point value that is related to the switch based on the brightness value and the first predetermined order setting.

5. The dimming method as claimed in claim 1, wherein step (B) further includes setting a pulse starting point value that is related to the switch based on the brightness value and a second predetermined order setting.

6. The dimming method as claimed in claim 1, wherein the first predetermined order setting indicates respective order numbers of multiple time intervals, and step (C) includes sub-steps of:
    (C1) determining whether the brightness value is equal to an upper limit of the brightness value, where the upper limit of the brightness value is equal to a product of the first predetermined reference value and a second predetermined reference value minus one;
    (C2) when it is determined in sub-step (C1) that the brightness value is equal to the upper limit of the brightness value, setting the pulse width value to be equal to the second predetermined reference value;
    (C3) when it is determined in sub-step (C1) that the brightness value is not equal to the upper limit of the brightness value, determining whether a remainder of the brightness value divided by the first predetermined reference value is non-zero;
    (C4) when it is determined in sub-step (C3) that the remainder of the brightness value divided by the first predetermined reference value is non-zero, with respect to each of the time intervals, setting the magnitude value to be equal to a quotient of the brightness value divided by the first predetermined reference value plus one in a case where the order number of the time interval is smaller than the remainder of the brightness value divided by the first predetermined reference value, and to be equal to the quotient of the brightness value divided by the first predetermined reference value in a case where the order number of the time interval is greater than or equal to the remainder of the brightness value divided by the first predetermined reference value;
    (C5) when it is determined in sub-step (C3) that the remainder of the brightness value divided by the first predetermined reference value is not non-zero, setting the magnitude value to be equal to the brightness value divided by the first predetermined reference value; and
    (C6) setting the pulse width value to be equal to the first predetermined reference value.

7. The dimming method as claimed in claim 1, wherein the first predetermined order setting indicates respective order numbers of multiple time intervals, and step (C) includes sub-steps of:
    (C1) determining whether a remainder of the brightness value divided by the first predetermined reference value is non-zero;
    (C2) when it is determined in sub-step (C1) that the remainder of the brightness value divided by the first predetermined reference value is non-zero, with respect to each of the time intervals, setting the magnitude value to be equal to a quotient of the brightness value divided by the first predetermined reference value plus one in a case where the order number of the time interval is smaller than the remainder of the brightness value divided by the first predetermined reference value, and to be equal to the quotient of the brightness value divided by the first predetermined reference value in a case where the order number of the time interval is greater than or equal to the remainder of the brightness value divided by the first predetermined reference value;
    (C3) when it is determined in sub-step (C1) that the remainder of the brightness value divided by the first predetermined reference value is not non-zero, setting the magnitude value to be equal to the brightness value divided by the first predetermined reference value; and
    (C4) setting the pulse width value to be equal to the first predetermined reference value.

8. The dimming method as claimed in claim 1, further comprising a step of:
    generating a magnitude control signal for controlling the current generator based on the magnitude value, and generating a pulse signal for controlling the switch based on the pulse width value.

9. A current driving device adapted to drive a light emitting element based on a brightness value, and comprising:
    a switch adapted to be coupled to the light emitting element, receiving a pulse signal, and switching between conduction and non-conduction based on the pulse signal, said switch conducting within each pulse of the pulse signal and not conducting outside each pulse of the pulse signal;

a current generator coupled to said switch, receiving a magnitude control signal, and generating a drive current based on the magnitude control signal, the drive current having a magnitude related to the magnitude control signal, and flowing through the light emitting element when said switch conducts; and a brightness divider coupled to said switch and said current generator, receiving the brightness value, and determining whether the brightness value is smaller than or equal to a first predetermined reference value;

when it is determined that the brightness value is smaller than or equal to the first predetermined reference value, said brightness divider setting a magnitude value, and setting a pulse width value based on the brightness value;

when it is determined that the brightness value is not smaller than or equal to the first predetermined reference value, said brightness divider setting the magnitude value based on the brightness value, the first predetermined reference value and a first predetermined order setting, and setting the pulse width value based on the first predetermined reference value;

said brightness divider generating the magnitude control signal for receipt by said current generator based on the magnitude value, and generating the pulse signal for receipt by said switch based on the pulse width value.

10. The current driving device as claimed in claim 9, wherein said brightness divider further stores multiple order settings, and selects one of the order settings to serve as the first predetermined order setting.

11. The current driving device as claimed in claim 9, wherein:

when it is determined that the brightness value is smaller than or equal to the first predetermined reference value, said brightness divider sets the magnitude value to be equal to one, and sets the pulse width value to be equal to the brightness value.

12. The current driving device as claimed in claim 9, wherein:

when it is determined that the brightness value is smaller than or equal to the first predetermined reference value, said brightness divider further sets a pulse starting point value based on the brightness value and the first predetermined order setting.

13. The current driving device as claimed in claim 9, wherein:

when it is determined that the brightness value is smaller than or equal to the first predetermined reference value, said brightness divider further sets a pulse starting point value based on the brightness value and a second predetermined order setting.

14. The current driving device as claimed in claim 9, wherein:

the first predetermined order setting indicates respective order numbers of multiple time intervals;

when the brightness value is equal to an upper limit of the brightness value, said brightness divider sets the pulse width value to be equal to a second predetermined reference value, where the upper limit of the brightness value is equal to a product of the first predetermined reference value and the second predetermined reference value minus one;

when the brightness value is not equal to the upper limit of the brightness value and a remainder of the brightness value divided by the first predetermined reference value is non-zero, with respect to each of the time intervals, said brightness value sets the magnitude value to be equal to a quotient of the brightness value divided by the first predetermined reference value plus one in a case where the order number of the time interval is smaller than the remainder of the brightness value divided by the first predetermined reference value, and to be equal to the quotient of the brightness value divided by the first predetermined reference value in a case where the order number of the time interval is greater than or equal to the remainder of the brightness value divided by the first predetermined reference value; and when the brightness value is not equal to the upper limit of the brightness value and the remainder of the brightness value divided by the first predetermined reference value is not non-zero, said brightness divider sets the magnitude value to be equal to the brightness value divided by the first predetermined reference value.

15. The current driving device as claimed in claim 9, wherein:

the first predetermined order setting indicates respective order numbers of multiple time intervals;

when a remainder of the brightness value divided by the first predetermined reference value is non-zero, with respect to each of the time intervals, said brightness value sets the magnitude value to be equal to a quotient of the brightness value divided by the first predetermined reference value plus one in a case where the order number of the time interval is smaller than the remainder of the brightness value divided by the first predetermined reference value, and to be equal to the quotient of the brightness value divided by the first predetermined reference value in a case where the order number of the time interval is greater than or equal to the remainder of the brightness value divided by the first predetermined reference value; and when the remainder of the brightness value divided by the first predetermined reference value is not non-zero, said brightness divider sets the magnitude value to be equal to the brightness value divided by the first predetermined reference value.

\* \* \* \* \*